United States Patent
Yokoyama et al.

[11] Patent Number: 6,042,311
[45] Date of Patent: Mar. 28, 2000

[54] CHAMFERING APPARATUS

[75] Inventors: Toshiki Yokoyama; Munenori Yamaguchi; Yasuo Kazama, all of Tokyo, Japan

[73] Assignee: Nitto Kohki Co., Ltd., Japan

[21] Appl. No.: 09/285,496

[22] Filed: Mar. 26, 1999

[30] Foreign Application Priority Data

Mar. 26, 1998 [JP] Japan .................................. 10-078627

[51] Int. Cl.[7] ............................... B23C 1/20; B23C 1/12; B27C 5/10
[52] U.S. Cl. ..................... 409/138; 409/178; 409/182; 409/214; 144/136.95; 144/154.5
[58] Field of Search ................................... 409/137, 138, 409/181, 182, 175, 204, 205, 206, 210, 214; 408/67; 144/136.95, 154.5

[56] References Cited

U.S. PATENT DOCUMENTS

| | | | |
|---|---|---|---|
| 2,823,713 | 2/1958 | Goldsmith | 144/136.95 |
| 4,088,164 | 5/1978 | McCord, Jr. | 408/67 |
| 4,613,261 | 9/1986 | Maier et al. | 409/137 |
| 4,913,204 | 4/1990 | Moores et al. | 409/182 |
| 4,971,122 | 11/1990 | Sato et al. | 409/182 |
| 5,273,091 | 12/1993 | Shibata | 409/175 |
| 5,291,928 | 3/1994 | Keith, Jr. et al. | 144/136.95 |
| 5,423,642 | 6/1995 | Heck | 409/138 |
| 5,961,260 | 10/1999 | Kasler et al. | 409/137 |

FOREIGN PATENT DOCUMENTS

357379  12/1991  Japan .

Primary Examiner—Andrea L. Pitts
Assistant Examiner—Erica D. Ergenbright
Attorney, Agent, or Firm—Fulbright & Jaworski L.L.P.

[57] ABSTRACT

A chamfering apparatus for chamfering a work has an adapter which surrounds a tool support, has one end fixed to a casing and the other end projecting from the casing, and is arranged coaxially with the axis of a rotating shaft. This chamfering apparatus includes an eccentric ring rotatably mounted around the adapter, a lock plate rotatably mounted around the eccentric ring, a work guide attached to the lock plate and having a predetermined guide direction to guide a tool support along the work, and keeping means for keeping the angle between the guide direction of the work guide and the output shaft of a motor at a predetermined value when the lock plate and the work guide are translated with respect to the axis of the rotating shaft by rotating the eccentric ring with respect to the adapter.

12 Claims, 8 Drawing Sheets

ANGLE OF CHAMFER 45°

FIG. 6A

ANGLE OF CHAMFER 15°

CHAMFERING APPARATUS

BACKGROUND OF THE INVENTION

The present invention relates to a chamfering apparatus capable of chamfering the edge of the outer periphery of a work and, more particularly, to a chamfering apparatus capable of easily performing adjustment of the amount of chamfer, adjustment of the angle of chamfer, and exchange of a cutting tip, and efficiently collecting chips in a chip receptacle without scattering them around.

Figure 9:
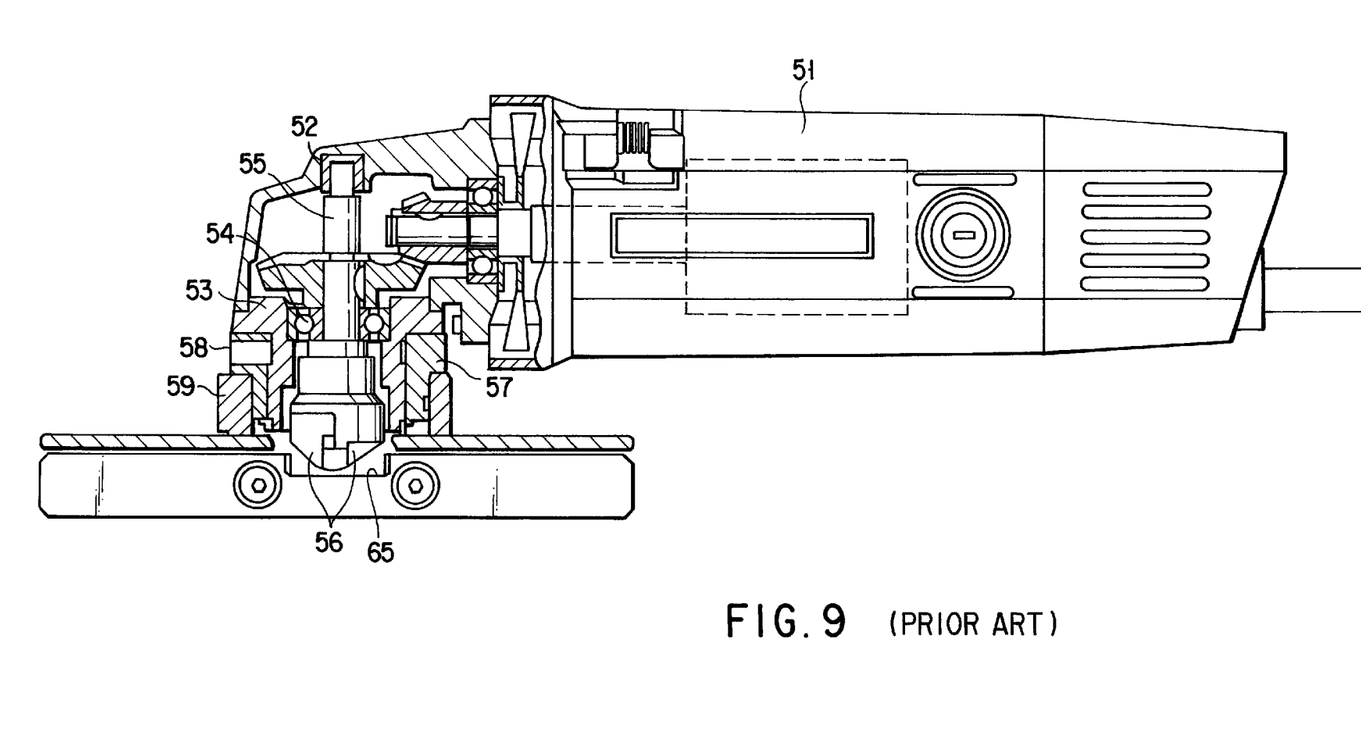
FIG. 9 is a partially cutaway front view of the side portion of a conventional chamfering apparatus.

The arrangement of a known chamfering apparatus disclosed in Jpn. UM Appln. KOKAI Publication No. 3-57379 will be explained briefly. FIG. 9 is a sectional front view of chamfering apparatus; and FIG. 10 is a side view of the same.

Figure 10:
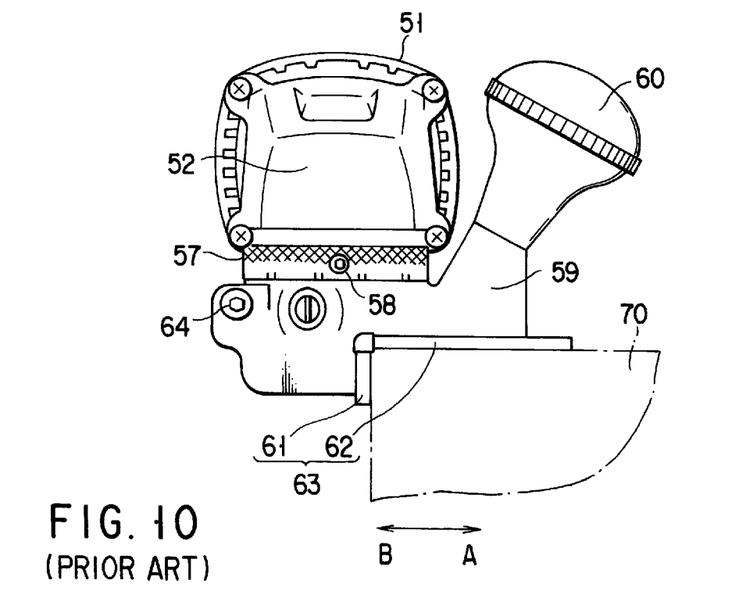
FIG. 10 is a front view of the front portion of the conventional chamfering apparatus shown in FIG. 9.

Referring to FIGS. 9 and 10, a gripping portion 51 stores an electric motor. An elbow-like rotating shaft housing 52 is mounted on the distal end of the gripping portion 51 to face down. A bearing portion 53 is fixed in the lower portion of the rotating shaft housing 52 to face down. A cutting tip 56 is detachably mounted on the lower portion of a rotating shaft 55 vertically supported by a bearing 54 of the bearing portion 53.

The bearing portion 53 has a cylindrical outer circumferential surface. An eccentric ring 57 for adjusting the projection amount (amount of chamfer) of the cutting tip 56 is provided around the bearing portion 53 of the rotating shaft housing 52 to be rotatable about the bearing portion 53. The eccentric ring 57 has a cylindrical outer circumferential surface which is eccentric with respect to its inner circumferential surface. A fixing bolt 58 fixes the bearing portion 53 and eccentric ring 57. Around the eccentric ring 57, a support bracket 59 having a boss is rotatably disposed on the lower end side of the eccentric ring 57. An auxiliary knob 60 and a guide plate 63 are attached to the support bracket 59. The guide plate 63 is formed of a vertical plate 61 and horizontal plate 62 that extend perpendicularly in an L-shape, to constitute a guide surface movable along a work surface. A slit is formed in the support bracket 59. When a fastening bolt 64 provided to this slit is tightened, the support bracket 59 can be fixed to the eccentric ring 57. An opening 65 is formed in the narrow angle of the perpendicularly intersecting portion of the guide plate 63. The cutting tip 56 at the lower end portion of the rotating shaft 55 can be seen through this opening 65.

The function of the chamfering apparatus having the above arrangement will be described. When the power cord is connected to the power supply and the switch is turned on, the cutting tip 56 rotates. The guide plate 63 is used to guide the corner portion of a work 70. The cutting tip 56 is set to oppose the ridge portion of the work 70 from the side surface. When the chamfering apparatus is moved, the ridge portion is chamfered.

When the fastening bolt 64 is loosened and the support bracket 59 is rotated with respect to the eccentric ring 57, the guide plate 63 moves forward/backward in the directions of arrows A and B in accordance with the degree of eccentricity. Hence, the amount of chamfer can be adjusted.

While the fixing bolt 58 is loosened and the fastening bolt 64 is fastened to fix the support bracket 59 on the eccentric ring 57, when the eccentric ring 57 is pivoted, the support bracket 59 attached with the guide plate 63 and auxiliary knob 60 can be pivoted about the axis of the cutting tip 56 both clockwise and counterclockwise. As a result, the directions of the guide plate 63 and auxiliary knob 60 can be freely changed to facilitate operation.

In the above chamfering apparatus, when the amount of chamfer is to be adjusted, the fixing bolt 58 must be loosened and thereafter the eccentric ring 57 must be rotated around the bearing portion 53, making it cumbersome to adjust the amount of chamfer. When the eccentric ring 57 is rotated in order to adjust the amount of chamfer, the angle the gripping portion 51 of the motor makes with the support bracket 59 sometimes changes inadvertently. As a result, to obtain an optimum angle of the auxiliary knob 60 and gripping portion 51 after the amount of chamfer is adjusted, the angle of the gripping portion 51 must be adjusted again.

The angle of chamfer is also adjusted by exchanging the cutting tip 56. Hence, adjusting the angle of chamfer is difficult to perform.

When the cutting tip 56 wears out and need be exchanged, it cannot be exchanged unless the support bracket 59 is removed, resulting in a cumbersome tip exchange operation.

Since this apparatus does not have a chip receptacle for collecting chips generated during machining, the chips scatter around, which is not preferable in terms of environment.

BRIEF SUMMARY OF THE INVENTION

It is an object of the present invention to provide a chamfering apparatus which can easily perform adjustment of the amount of chamfer, adjustment of the angle of chamfer, and exchange of a cutting tip, and can efficiently collect chips in a chip receptacle without scattering them around, so that the problems described above are solved.

In order to achieve the above object, according to the present invention, there is provided a chamfering apparatus for chamfering a work, comprising a casing incorporating a motor having an output shaft, a rotating shaft which has a distal end portion projecting from the casing and an axis intersecting the output shaft of the motor, and is rotatably supported by the casing and driven by the output shaft of the motor to rotate, and a tool support which is attached to the distal end portion of the rotating shaft and has a cutting tip. This chamfering apparatus comprises an adapter which surrounds the tool support, has one end fixed to the casing and the other end projecting from the casing, and is arranged coaxially with the axis of the rotating shaft. This chamfering apparatus also comprises an eccentric ring rotatably mounted around the adapter, a lock plate rotatably mounted around the eccentric ring, a work guide attached to the lock plate and having a predetermined guide direction to guide the tool support along a work, and keeping means for keeping an angle between the guide direction of the work guide and the output shaft of the motor at a predetermined value when the lock plate and the work guide are translationally moved with respect to the axis of the rotating shaft by rotating the eccentric ring with respect to the adapter.

According to this chamfering apparatus, when the eccentric ring is rotated on the adapter, the lock plate on the eccentric ring and the work guide attached to the lock plate are translated with respect to the rotating shaft. Thus, the distance between the work guide and cutting tip is adjusted, and the cutting amount of the work by the cutting tip is adjusted. The keeping means keeps the angle between the guide direction of the work guide and the output shaft of the motor at an optimum value. Thus, the amount of chamfer can be adjusted very easily without adjusting the angle between the guide direction of the work guide and the output shaft of the motor again.

The keeping means preferably has a pin having one end fixed to the lock plate, an eccentric body rotatably mounted on the pin, a storing hole formed in the adapter to rotatably store the eccentric body, and a groove formed in a bottom surface of the storing hole to store the other end of the pin. When the lock plate moves, the eccentric body is preferably rotated on the pin to keep the angle between the guide direction of the work guide and the output shaft of the motor at a predetermined value. In this case, a chamfering apparatus having a simple structure can be formed with a very small number of components.

The groove preferably has an arcuated shape, and the eccentric body is preferably mounted on the pin at a position where an amount of eccentricity equal to that of the eccentric ring is formed. When the eccentric ring rotates with respect to the adapter, the lock plate is guided by the distal end portion of the pin along the arcuated groove to rotate with respect to the adapter. Hence, the eccentric body rotates about the pin, and the adapter, and accordingly the casing, rotates in an opposite direction with respect to the lock plate, and accordingly the work guide. The angle between the output shaft of the motor in the casing and the guide direction of the work guide is kept at a predetermined value.

The apparatus further preferably has positioning means capable of positioning the eccentric ring at a predetermined position with respect to the adapter. The positioning means, preferably, has an arcuated projection projecting outward in a radial direction from the adapter, an arcuated, elongated hole formed to extend through the projection along an arcuated shape of the projection, a manually operable operating portion projecting outward in the radial direction from the eccentric ring at a position adjacent to the projection, and a clamp lever extending through the elongated hole and capable of fastening the projection on the operating portion through the elongated hole.

The operating portion preferably has a threaded hole formed at a position matching the elongated hole, and the clamp lever preferably has a male thread threadably engageable with the threaded hole through the elongated hole.

The apparatus preferably comprises a support plate swingably attached to the lock plate and mounted with the work guide. The support plate preferably exposes the tool support externally upon swinging in a direction to separate from the lock plate, thus enabling exchange of a cutting tip. In this case, the cutting tip can be exchanged easily without removing the work guide.

The apparatus preferably comprises lock means for removably fixing the support on the lock plate. The lock means may have a pair of shafts pivotally mounted on the support plate, a block member mounted on the shafts to be slidably movable in an axial direction thereof and spring-biased toward the support plate, and a knob attached to the block member to be operated manually.

The apparatus preferably comprises a pair of adjustment plates for supporting the work guide and attached to the support plate to be pivotal about an axis parallel to the guide direction of the work guide. The work guide is preferably pivoted by the adjustment plates to enable adjustment of the angle the cutting tip makes with the work. In this case, the angle of chamfer of the work can be adjusted very easily.

The work guide preferably has an opening where a cutting tip can extend, and comprises a chip receptacle attached to the support plate at a portion opposing the opening to collect chips generated from the work. The chip receptacle prevents the chips from scattering around to ensure safety of the surrounding environment. The chip receptacle preferably has a hopper which abuts against the work guide around the opening. The hopper preferably has such a resiliency as to maintain abutment against the work guide when the work guide is pivoted by the adjustment plates. In this case, even when the work guide is pivoted, the receiving member follows the movement of the work guide, and no gap is formed between the chip receptacle and the work guide. As a result, chips can be collected in the chip receptacle easily and reliably. When the chip receptacle has an openable/closeable lid to enable discharge of chips, chips can be removed from the chip receptacle easily.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

The present invention will be described in detail by way of its preferred embodiment shown in the accompanying drawings.

Figure 1:
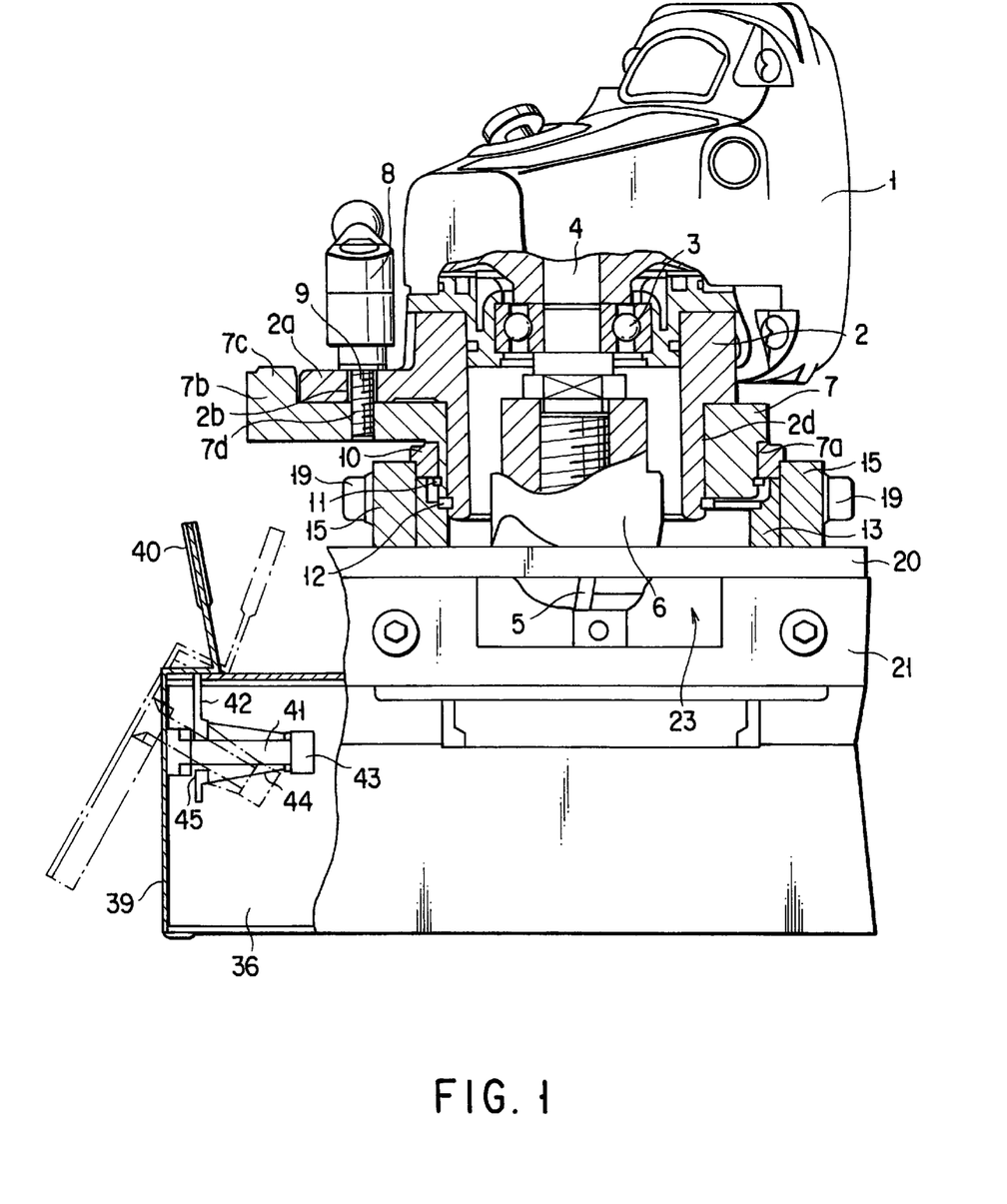
FIG. 1 is a partially sectional, schematic front view of the front portion of a chamfering apparatus according to a preferable embodiment of the present invention.
Figure 2:
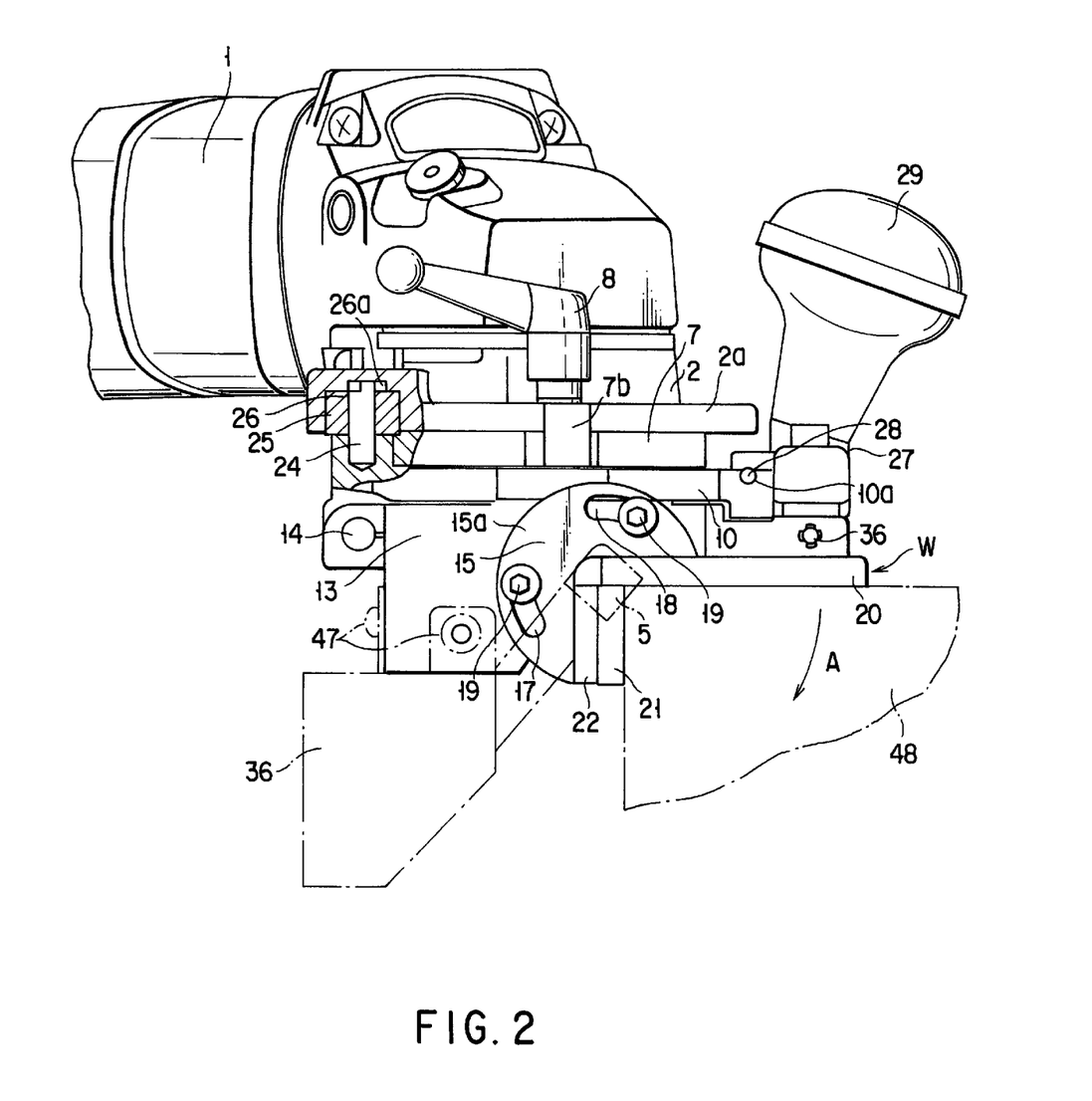
FIG. 2 is a partially sectional front view of the side portion of the chamfering apparatus shown in FIG. 1.
Figure 3:
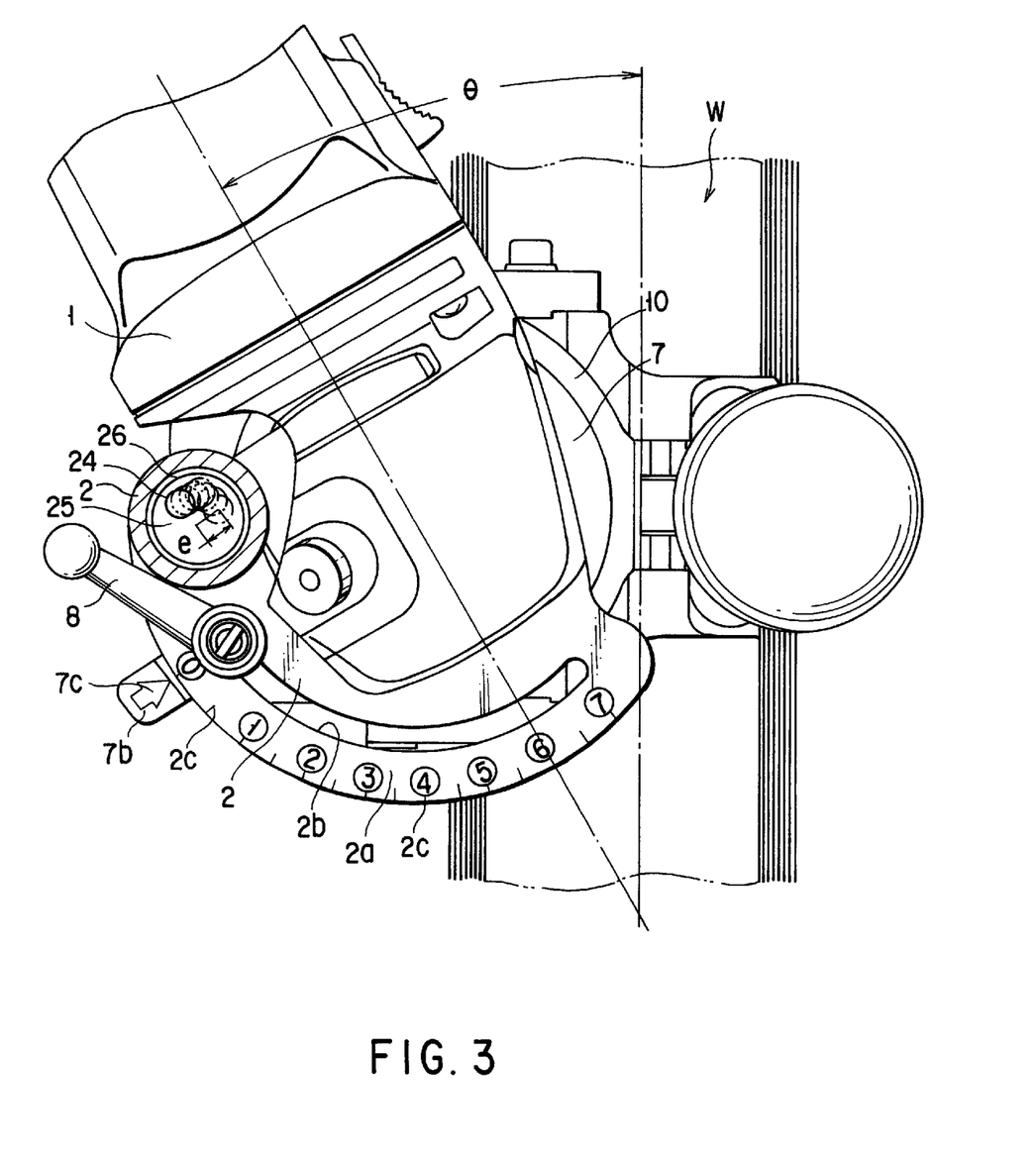
FIG. 3 is a partially cutaway plan view of the chamfering apparatus shown in FIG. 1.

Referring to FIGS. 1 to 3, a casing 1 incorporates a motor as a drive source. An adapter 2 is integrally attached to the lower opening of the casing 1 with a fixing means such as a bolt (not shown). A bearing 3 is mounted on the surface defining this opening, i.e., in the central portion of the adapter 2. A rotating shaft 4, is supported by the bearing 3, and rotational movement of the motor output shaft is transmitted to the shaft 4 through a reduction mechanism. A tool support 6 carrying a cutting tip 5 is detachably, threadably mounted on the rotating shaft 4.

An arcuated projection 2a is formed on the adapter 2 to project outward from the casing 1, as shown in FIG. 3. An arcuated, elongated hole 2b is formed in the projection 2a to extend through it. A chamfer adjustment scale 2c (see FIG. 3) is graduated on the outer, upper surface defining the arcuated, elongated hole 2b.

A cylindrical portion 2d is formed at the central portion of the lower surface of the flat plate-like projection 2a of the adapter 2 to be concentric with the rotating shaft 4. An eccentric ring 7 is rotatably fitted around the cylindrical portion 2d. The outer circumferential surface of the eccentric ring 7 forms an eccentric portion 7a having a central portion eccentric from the rotating shaft 4 by a predetermined distance. The eccentric portion 7a is rotatable with respect to a lock plate 10 (to be described later). An operating portion 7b for rotating the eccentric ring 7 on the adapter 2 is provided to the eccentric ring 7 to project from the outer circumferential surface of the projection 2a of the adapter 2. A pointing device 7c to be used with the adjustment scale 2c is provided to the upper surface of the operating portion 7b. A threaded hole or a female thread 7d is formed on a line connecting the center of the operating portion 7b and the axis of the rotating shaft 4. The female thread 7d can threadably engage with a male thread 9 on a clamp lever 8 extending through the arcuated, elongated hole 2b formed in the adapter 2. When the clamp lever 8 is operated in the fastening direction, it can fix the adapter 2 and eccentric ring 7 integrally. When the clamp lever 8 is operated in the loosening direction, it can disengage the adapter 2 and eccentric ring 7 from each other. In this disengaged state, the operating portion 7b can rotate the eccentric ring 7 around the adapter 2. At this time, the male thread 9 of the clamp lever 8, together with the eccentric ring 7, moves along the arcuated, elongated hole 2b formed in the adapter 2.

The lock plate 10 described above is attached to the outer circumferential surface of the eccentric ring 7 with a retaining ring 11, and the lower end of the eccentric ring 7 is prevented by a retaining ring 12 from dropping from the adapter 2.

As shown in FIG. 2, a support plate 13 is attached to the lock plate 10 through a shaft 14 to be swingable in the direction of an arrow A. Angle-of-chamfer adjustment plates 15 each having an angle adjustment scale 15a are placed on the right and left sides in FIG. 1 of the support plate 13. Two arcuated through grooves 17 and 18 are formed in each angle-of-chamfer adjustment plate 15. Fixing bolts 19 extend through the arcuated through grooves 17 and 18 to be fixed on the support plate 13. When the fixing bolts 19 are loosened, the angle-of-chamfer adjustment plates 15 can rotate with respect to the support plate 13 as it is guided by the fixing bolts 19 along the arcuated through grooves 17 and 18.

A work guide W is constituted by a reinforcing plate 22 and a horizontal plate 20 and vertical plate 21 forming a right-angled portion or an L-shaped section, and is integrally attached to the right and left angle-of-chamfer adjustment plates 15 with screws. An opening portion 23 (FIG. 1) is formed in the right-angled portion of the work guide W. The opening portion 23 provides a space through which the cutting tip 5 moves forward/backward with respect to the work guide W and serves as a inlet port through which chips are received in a chip receptacle (described later). While the fixing bolts 19 on the two sides are loosened, when the angle-of-chamfer adjustment plates 15 rotate with respect to the support plate 13, the work guide W also rotates to change the angle of a work 48 with respect to the cutting tip 5, i.e., the angle of chamfer.

Referring to FIG. 2, a fixing pin 24 extends vertically on the lock plate 10 to move the lock plate 10 translationally while keeping the casing 1 at a constant angle. An eccentric body 25 is rotatably fitted on the fixing pin 24. The eccentric body 25 is rotatably fitted in a storing space 26 formed in the adapter 2. An arcuated control groove 26a is formed in the bottom surface of the storing space 26 to control movement of the fixing pin 24 when the eccentric ring 7 rotates. The length of the control groove 26a corresponds to the length for which the lock plate 10, accordingly the fixing pin 24, moves when the male thread 9 moves in the arcuated, elongated hole 2b of the adapter 2. An amount e of eccentricity (see FIG. 3) of the eccentric body 25 is set to be equal to the amount of eccentricity of the eccentric ring 7 (i.e., the amount of eccentricity of the eccentric ring 7 with respect to the rotating shaft 4). When the amount of chamfer of the cutting tip 5 is adjusted by operating the eccentric ring 7 in a manner to be described later, an angle θ the casing 1 incorporated in the motor makes with the work guide W will not change, i.e., such that the casing 1 moves translationally relative to the work guide W, as shown in FIG. 3 (translational movement of the work guide W is indicated by a plurality of lines). In this manner, the eccentric body 25 performs a function of preventing the angle θ the casing 1 makes with the work guide W from changing when the amount of chamfer is adjusted.

Referring to FIG. 2, a pin locking portion 10a is formed on the lock plate 10 on a side opposite to the shaft 14. A lock pin 28 is provided on a lock block 27 constituting a fixing means (to be described later) that fixes the lock plate 10 and support plate 13, and engages with the pin locking portion 10a.

The arrangement of the lock block 27 constituting the fixing means will be described in more detail with reference to FIGS. 4A and 4B.

Figure 4A:
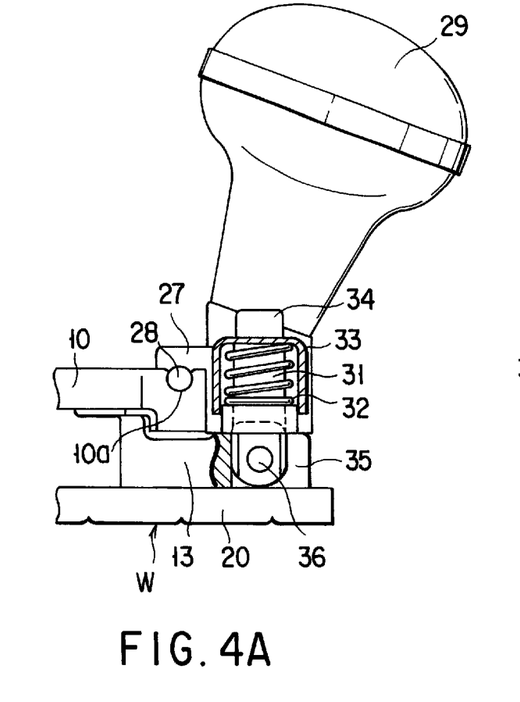
FIGS. 4A and 4B show the internal structure of the lock block shown in FIG. 2.
Figure 4B:
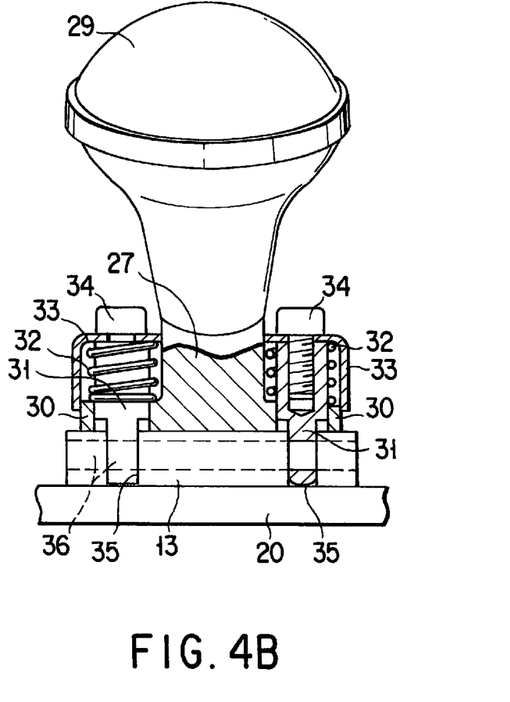

Referring to FIG. 4A, the lock block 27 is integrally formed with a knob 29 and the lock pin 28 which extends perpendicularly to the surface of the sheet of drawing. As shown in FIG. 4B, through holes 30 are formed in the right and left sides of the lock block 27. Shafts 31 extend through the through holes 30, respectively. The lower end portions of the shafts 31 are fitted in groove portions 35 of the support plate 13 on the horizontal plate 20 constituting the part of the work guide W, and are pivotally mounted on a shaft 36. Covers 33 are fixed with screws 34 to the head portions of the shafts 31 that project upward from the through holes 30 of the lock block 27. Coil springs 32 are held around the shafts 31 with the covers 33. When the knob 29 is pulled upward in FIGS. 4A and 4B against the biasing force of the coil springs 32, the lock pin 28 formed on the lock block 27 disengages from the pin locking portion 10a formed on the lock plate 10. In this state, when the knob 29 is toppled clockwise in FIG. 4A about the shaft 36, the support plate 13 mounted with the work guide W swings downward in FIG. 4A to expose the cutting tip 5. This facilitates exchange of the cutting tip 5. Assume that the knob 29 is swung in the opposite direction to that described above. When the knob 29 is released while the lock pin 28 is aligned with the pin locking portion 10a, the lock pin 28 engages with the pin locking portion 10a by the biasing force of the coil springs 32, and the support plate 13 is fixed to the lock plate 10.

As shown in FIG. 2, a chip receptacle 80 is detachably fixed to the support plate 13 with an arbitrary means such as screws 47.

Figure 5:
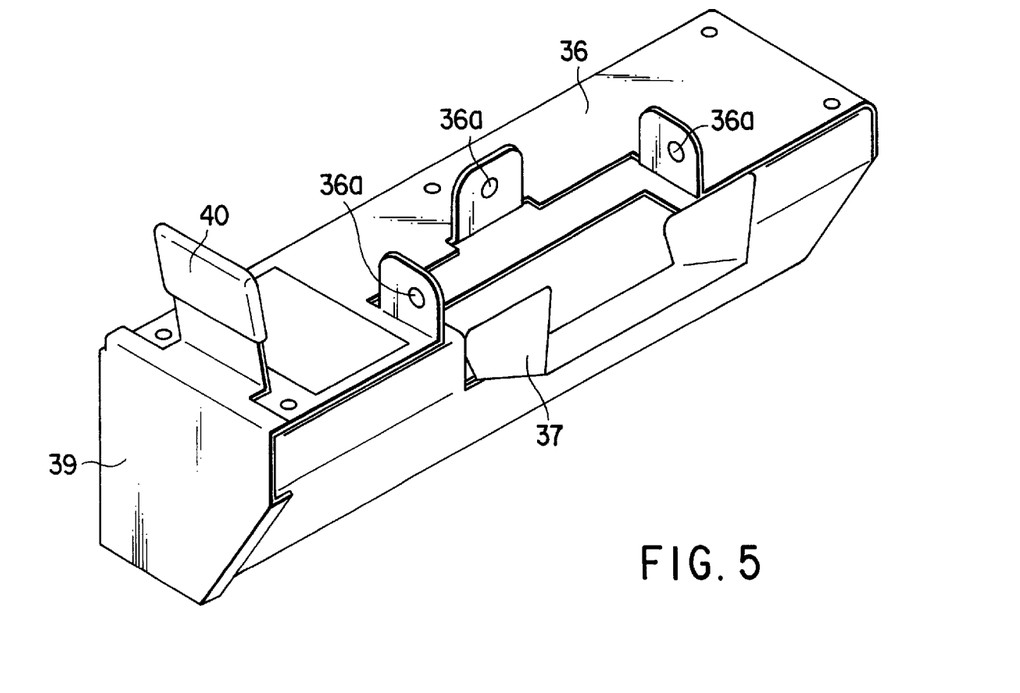
FIG. 5 is a perspective view of a chip receptacle.
Figure 6A:
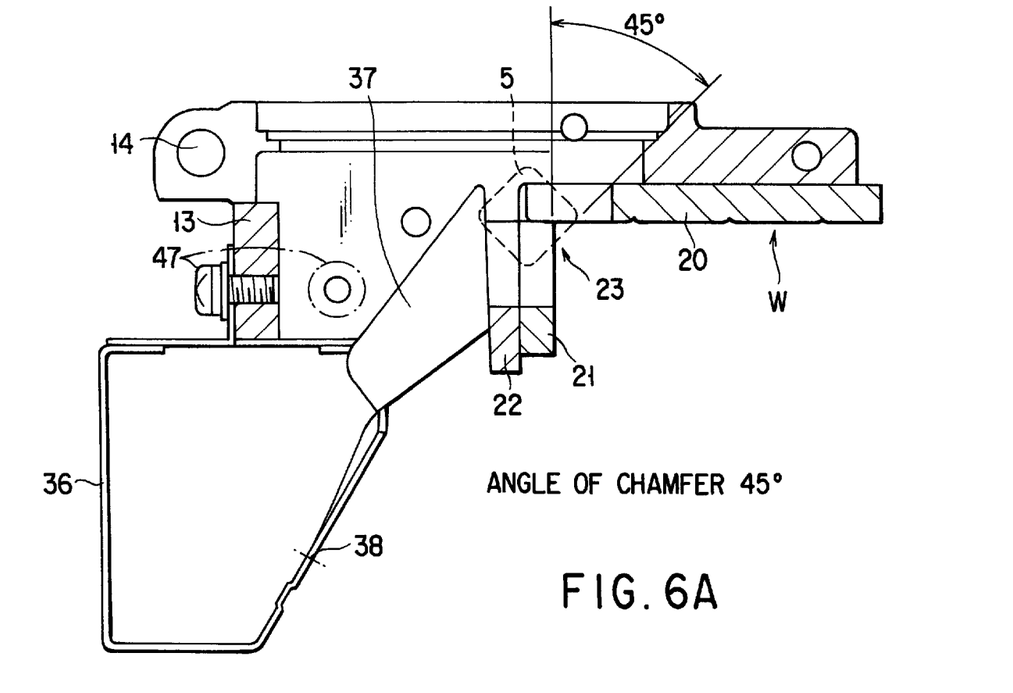
FIGS. 6A and 6B are views showing the positional relationship between a work guide and the chip receptacle obtained when the work guide of the chamfering apparatus is tilted.
Figure 6B:
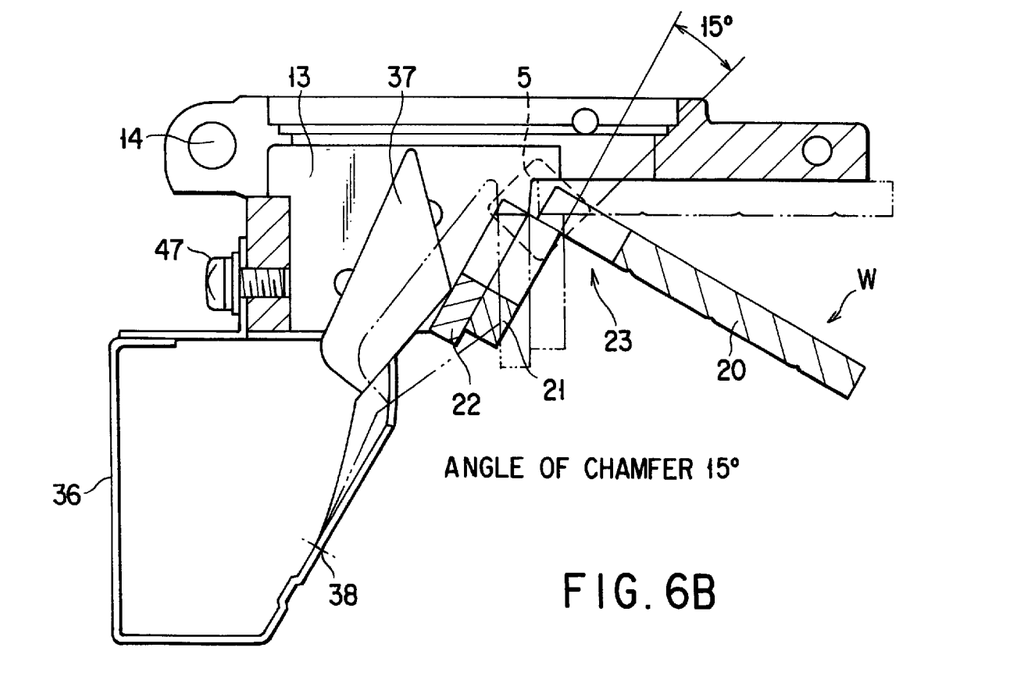

As shown in FIG. 5, the chip receptacle 80 has a chip hopper 37 at a position corresponding to the opening portion 23 formed in the work guide W. The chip hopper 37 is made of an appropriate resilient material such as spring steel. The lower end portion of the chip hopper 37 is fixed to the chip receptacle 80 by spot welding or with rivets or screws, as shown in the drawings. The chip hopper 37 can be tilted about a spot-welded fixing portion 38 as a fulcrum. Three screw holes 36a are formed in the chip receptacle 80. When the chip receptacle 80 is attached to the support plate 13 with the screws 47 and the screw holes 36a, the chip hopper 37 abuts against the peripheral portion of the opening portion 23, as shown in FIG. 6A. From the state of FIG. 6A, in order to adjust the angle of chamfer, the fixing bolts 19 are loosened, and the angle-of-chamfer adjustment plates 15 are rotated with respect to the support plate 13 along the arcuated through grooves 17 and 18. Then, the work guide W also rotates simultaneously to reach the state shown in FIG. 6B. Following the movement of the work guide W, the chip hopper 37 is also tilted about the fixing portion 38 as a fulcrum. Hence, no gap is formed between the work guide W and chip hopper 37. As the chip hopper 37 is made of an appropriate resilient material, the chip hopper 37 itself abuts against the work guide W by this resilience. Therefore, chips are prevented from scattering around during chamfering, and can be easily collected in the chip receptacle 80 through the chip hopper 37.

As shown in FIG. 5, a lid 39 is attached to the end portion of the chip receptacle 80 to allow removal of the chip accumulated in the receptacle 80. The lid 39 is integrally formed with a lever 40. When the lever is toppled, chips can be removed from the chip receptacle 80.

The arrangement of the lid 39 will be described with reference to FIG. 1. The lid 39 provided to the chip receptacle 80 has such a shape to close the end opening of the chip receptacle 80, and the lid 39 is integrally formed with the lever 40 that opens/closes the lid 39. A bolt 41 extends perpendicularly from the lid 39. The bolt 41 extends through a hole 45 formed in a support plate 42 provided to the chip receptacle 80. A conical coil spring 44 is placed between a bolt head portion 43 and the support plate 42. The lid 39 normally closes the end opening of the chip receptacle 80 with the biasing force of the conical coil spring 44 (the state indicated by a solid line in FIG. 1). From this state, when the lever 40 is operated to the state indicated by an alternate long and short dashed line in FIG. 1 against the biasing force of the conical coil spring 44, the lid 39 is opened, and the chip can be removed through the opening.

Figure 7A:
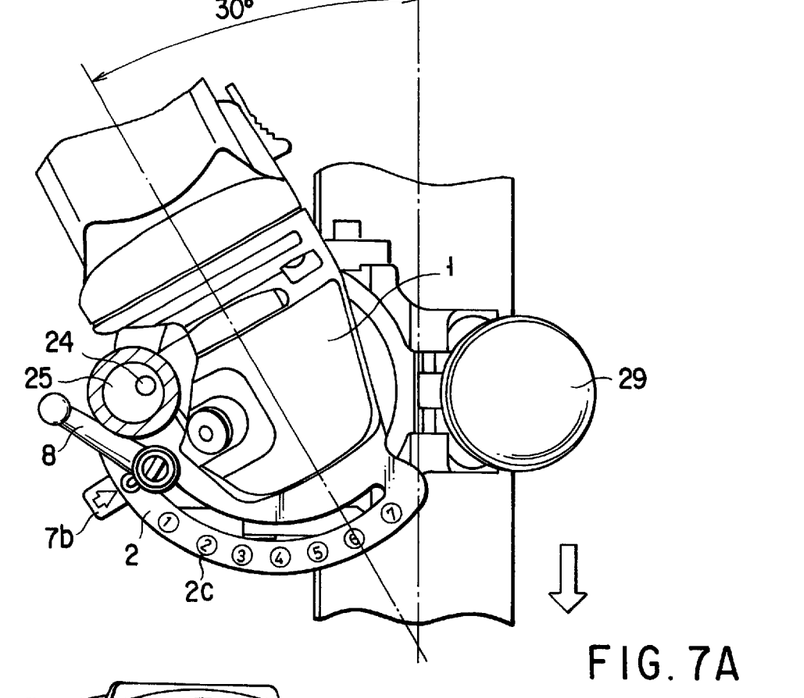
FIGS. 7A and 7B are a partially sectional plan view and a partially sectional front view of the side portion, respectively, of the chamfering apparatus set in the operable state.
Figure 7B:
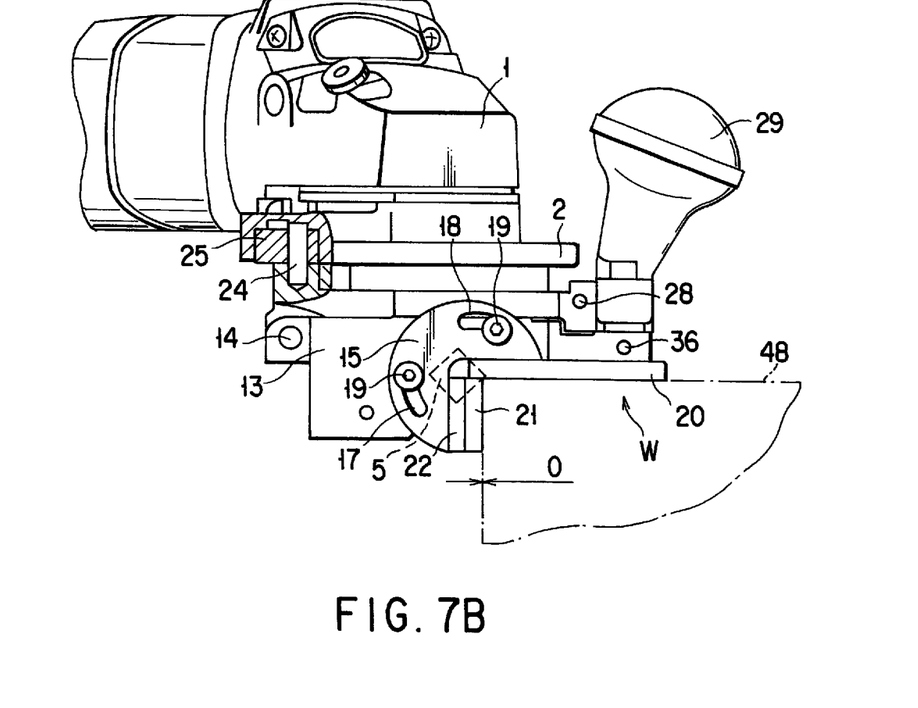

The operation of the chamfering apparatus having the above arrangement will be described with reference to FIGS. 7A and 7B.

When a power cord (not shown) is connected to an external power supply and a switch formed in the outer surface of the casing 1 is turned on, the output shaft of the motor rotates, the rotating shaft 4 rotates through a reduction mechanism in a reduced speed, and the tool support 6 mounted at the lower end of the rotating shaft 4 and having the cutting tip 5 rotates.

Subsequently, the work guide W having the L-shaped section is used to guide the corner of the work 48, and the cutting tip 5 held by the tool support 6 is set to oppose the edge of the work 48 from the side surface. When the chamfering apparatus is moved in the cutting direction in FIG. 7A, the edge portion of the work 48 can be chamfered at an angle of 45° by the tool point of the cutting tip 5 which is inclined at an angle of 45°.

To adjust the amount of chamfer, the clamp lever 8 is loosened to disengage the adapter 2 and eccentric ring 7 from each other. In this state, the operator holds the operating portion 7b of the eccentric ring 7 and rotates it with respect to the adapter 2 in accordance with the amount of chamfer while observing the scale 2c formed on the projection 2a of the adapter 2. Then, the lock plate 10 moves in the left-to-right direction in the drawing in accordance with the amount of eccentricity of the eccentric ring 7. Adjustment of the amount of chamfer can be performed by aligning the scale 2c and the pointing device 7c of the operating portion 7b. At this time, the eccentric body 25 is rotatably fitted on the adapter 2 with an eccentricity in an amount equal to the amount of eccentricity of the eccentric ring 7. Hence, when the eccentric ring 7 is operated to adjust the amount of chamfer of the cutting tip 5, the casing 1 incorporating the motor is translationally moved while constantly keeping a predetermined angle $\theta$ (30° in FIG. 7A) with respect to the work guide W, and the angle $\theta$ of the casing 1 does not change. The conventional chamfering apparatus does not have a regulating member such as an eccentric body. When the amount of chamfer is changed, the angle $\theta$ the casing 1 makes with the work guide W undesirably changes accordingly. The angle of the casing 1 must be adjusted again after the amount of chamfer is adjusted, which is tedious operation. In the present invention, since the eccentric body is used, the angle $\theta$ formed by the casing 1 and work guide W is constant. The casing 1 and work guide W are always maintained at positions providing good operability, and chamfering is facilitated.

Adjustment of the angle of chamfer can be performed by rotating the angle-of-chamfer adjustment plates 15 on the side surfaces of the support plate 13 along the arcuated through grooves 17 and 18 while the fixing bolts 19 are loose. The work guide W also rotates together with the adjustment plates 15, to adjust the setting angle of the work 48 with respect to the cutting tip 5, i.e., the angle of chamfer.

Along with rotation of the work guide W, to follow the movement of the work guide W, the chip hopper 37 of the chip receptacle 80 is also tilted about the fixing portion 38 as a fulcrum as described above, and no gap is formed between the work guide W and chip hopper 37. As a result, chips can be prevented from scattering around during the chamfering operation, and can be easily collected in the chip receptacle 80.

Figure 8:
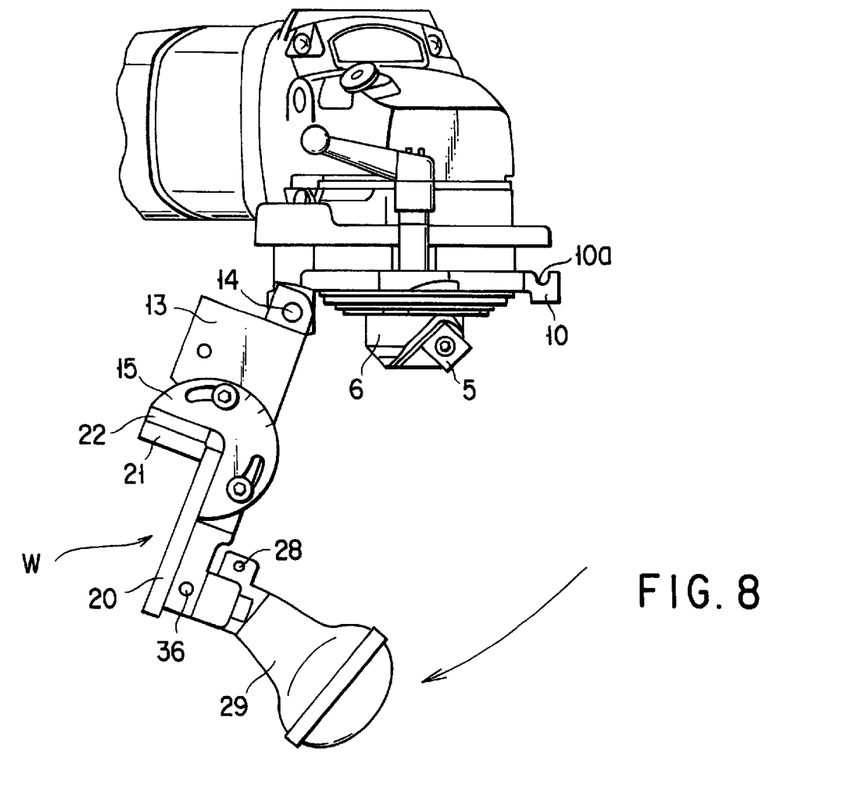
FIG. 8 is a front view of the side portion showing a state wherein the support plate is swung to expose the cutting tip.

To exchange the cutting tip 5, the knob 29 is pulled upward against the biasing force of the coil springs 32. The lock pin 28 formed on the lock block 27 disengages from the pin locking portion 10a formed on the lock plate 10. In this state, when the knob 29 is toppled clockwise in FIG. 7B about the shaft 36, the support plate 13 having the work guide W swings downward in FIG. 8 to expose the cutting tip 5. This facilitates exchange of the cutting tip 5.

In the above embodiment, the lock plate 10 and support plate 13 serve as the fixing means and are operated by the knob 29. However, other fixing means providing the same function, e.g., a fixing means constituted by a wire and buckle, can be employed.

The present invention can be practiced in various other manners without departing from the spirit or major feature of the invention. The embodiment described above is merely an exemplary case in any respect and should not be interpreted limitedly.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

We claim:

1. A chamfering apparatus for chamfering a work, comprising a casing incorporating a motor having an output shaft, a rotating shaft which has a distal end portion projecting from said casing and an axis intersecting said output shaft of said motor, and is rotatably supported by said casing and driven by said output shaft of said motor to rotate, and a tool support which is attached to said distal end portion of said rotating shaft and has a cutting tip, said chamfering apparatus further comprising an adapter which surrounds said tool support, has one end fixed to said casing and the other end projecting from said casing, and is arranged coaxially with the axis of said rotating shaft, an eccentric ring rotatably mounted around said adapter, a lock plate rotatably mounted around said eccentric ring, a work guide attached to said lock plate and having a predetermined guide direction to guide said tool support along a work, and keeping means for keeping an angle between the guide direction of said work guide and said output shaft of said motor at a predetermined value when said lock plate and said work guide are translationally moved with respect to the axis of said rotating shaft by rotating said eccentric ring with respect to said adapter.

2. A chamfering apparatus according to claim 1, wherein said keeping means has a pin having one end fixed to said lock plate, an eccentric body rotatably mounted on said pin, a storing hole formed in said adapter to rotatably store said eccentric body, and a groove formed in a bottom surface of said storing hole to store the other end of said pin, and when said lock plate moves, said eccentric body is rotated on said pin to keep the angle between the guide direction of said work guide and said output shaft of said motor at a predetermined value.

3. A chamfering apparatus according to claim 2, wherein said groove has an arcuated shape, and said eccentric body is mounted on said pin at a position where an amount of eccentricity equal to that of said eccentric ring is formed.

4. A chamfering apparatus according to claim 1, further having positioning means capable of positioning said eccentric ring at a predetermined position with respect to said adapter.

5. A chamfering apparatus according to claim 4, wherein said positioning means has an arcuated projection projecting outward in a radial direction from said adapter, an arcuated, elongated hole formed to extend through said projection along an arcuated shape of said projection, a manually operable operating portion projecting outward in the radial direction from said eccentric ring at a position adjacent to said projection, and a clamp lever extending through said elongated hole and capable of fastening said projection on said operating portion through said elongated hole.

6. A chamfering apparatus according to claim 5, wherein said operating portion has a threaded hole formed at a position matching with said elongated hole, and said clamp lever has a male thread threadably engageable with said threaded hole through said elongated hole.

7. A chamfering apparatus according to claim 1, comprising a support plate swingably attached to said lock plate and mounted with said work guide, said support plate serving to expose said tool support externally upon swinging in a direction to separate from said lock plate, thus enabling exchange of said cutting tip.

8. A chamfering apparatus according to claim 7, further comprising lock means for removably fixing said support plate on said lock plate.

9. A chamfering apparatus according to claim 8, wherein said lock means has a pair of shafts pivotally mounted on said support plate, a block member mounted on said shafts to be slidably movable an axial direction thereof and spring-biased toward said support plate, and a knob attached to said block member to be operated manually.

10. A chamfering apparatus according to claim 7, further comprising a pair of adjustment plates for supporting said work guide and attached to said support plate to be pivotal about an axis parallel to the guide direction of said work guide, wherein said work guide is pivoted by said adjustment plates to enable adjustment of an angle said cutting tip makes with the work.

11. A chamfering apparatus according to claim 10, wherein said work guide has an opening where a cutting tip can extend, and comprises a chip receptacle attached to said support plate at a portion opposing said opening to collect chip generated from the work, said chip receptacle having a receiving member which abuts against said work guide around said opening, and said receiving member having such an elasticity as to maintain abutment against said work guide when said work guide is pivoted by said adjustment plates.

12. A chamfering apparatus according to claim 11, wherein said chip receptacle has an openable/closeable lid to enable discharge of the chip.

* * * * *